(No Model.)

H. D. TAGGART.
PISTON.

No. 539,968. Patented May 28, 1895.

Witnesses
E. L. Nottingham
S. W. Foster

Inventor
Horace D. Taggart
By H. A. Seymour
Attorney

UNITED STATES PATENT OFFICE.

HORACE D. TAGGART, OF AKRON, OHIO, ASSIGNOR OF ONE-HALF TO THE GOODRICH HARD RUBBER COMPANY, OF SAME PLACE.

PISTON.

SPECIFICATION forming part of Letters Patent No. 539,968, dated May 28, 1895.

Application filed July 6, 1894. Serial No. 516,746. (No model.)

*To all whom it may concern:*

Be it known that I, HORACE D. TAGGART, a resident of Akron, in the county of Summit and State of Ohio, have invented certain new and useful Improvements in Pistons; and I do hereby declare the following to be a full, clear, and exact description of the invention, such as will enable others skilled in the art to which it appertains to make and use the same.

My invention relates to an improvement in pistons,—the object of the invention being to so construct a piston that the frictional contact thereof with the barrel in which it operates shall be reduced to a minimum.

A further object is to produce a piston which shall be so constructed that it shall be effectually prevented from shrinking and from becoming dry and hard.

A further object is to produce a piston which shall be simple in construction and effectual in all respects in the performance of its functions.

With these objects in view the invention consists in certain novel features of construction and combinations and arrangements of parts as hereinafter set forth, and pointed out in the claims.

Figure 1:
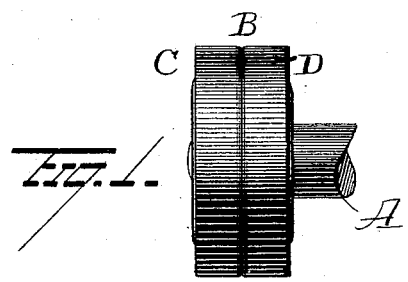
Figure 2:
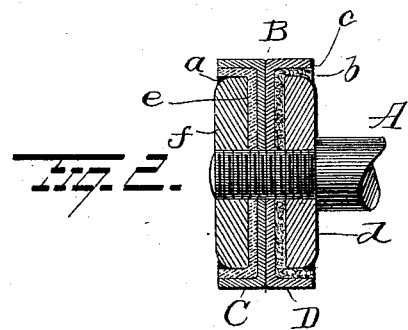
Figure 3:
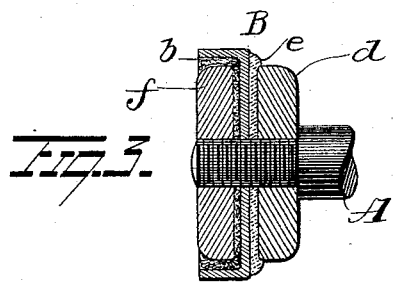

In the accompanying drawings, Figure 1 is a view illustrating my improved piston. Fig. 2 is a sectional view of the same. Fig. 3 is a view of a modification.

A represents a piston rod and B my improved piston fixed thereto. The piston comprises in its structure, two cups or cupped packing rings C, D, of light, thin flexible material, preferably kangaroo leather, said cups or rings being disposed back to back to produce front and rear chambers $a$, $b$, respectively and made with central perforations for the passage of the forward end of the piston rod A. Within the rear or lubricant holding chamber $b$, elastic, woolly lubricant holding packing material $c$ is placed and retained in position by means of a disk $d$ of any suitable material screwed upon or otherwise secured to the rod A. For the elastic packing $c$ I prefer to use wool or finely divided elastic fibrous material and said elastic packing is placed in the cup or packing ring D so that it will extend from a common center to the margin or periphery of the cup or ring. A disk or washer $e$ of soft leather or other suitable material capable of absorbing or holding lubricating material, is placed on the end of the rod A within the outer cup or ring C and held in position by means of a disk $f$ screwed upon or secured to the end of the rod A.

By the construction and arrangement of parts above described, the light, thin cup or ring will be made to properly bear against the wall of the barrel in which the piston is operated, without undue friction but with sufficient friction, by means of the elastic packing $c$. By locating the lubricant holding chamber in the rear portion of the piston, it will be out of reach of fluids entering the barrel in which the piston operates, thus preventing the lubricant chamber from being washed out by such fluids, but the lubricant, held by the elastic, woolly packing material, $c$, will be properly and effectually supplied to the absorbent washer $e$ in the forward portion of the piston by capillary attraction. If desired, both cups C, D, may be provided with elastic lubricant holding material.

When the piston is to be used in an air pump,—such, for instance, as is used for inflating bicycle tires,—a single (forward) cup B may be employed and the elastic lubricant holding material placed therein as shown in Fig. 3; or a single rear cup may be employed and provided with the yielding material.

A piston constructed in accordance with my invention will not shrink or become dry and hard and when not in use, the lubricant will not be forced out of it as it will not be under severe pressure within the barrel as is the case with most pistons.

My improvements are very simple in construction and effectual, in all respects, in the performance of their functions.

Slight changes might be made in the details of my invention without departing from the spirit thereof or limiting its scope, and hence I do not wish to limit myself to the precise details herein described, but Having fully described my invention, what I claim as new, and desire to secure by Letters Patent, is—

1. A piston comprising a cup composed of flexible material, an elastic lubricant holding material and an absorbent material, one material inside the cup and the other in rear thereof, and means for holding the several parts together, substantially as set forth.

2. A piston comprising two oppositely disposed cups of flexible material, an elastic lubricant holding material in one of said cups and an absorbent washer in the other substantially as set forth.

In testimony whereof I have signed this specification in the presence of two subscribing witnesses.

HORACE D. TAGGART.

Witnesses:
A. F. BARTGES,
CHAS. H. ISBELL.